3,197,373
IMMUNOLOGICAL AGENT

Francis C. Jackson, Gonzales, Tex., assignor to Texas A & M Research Foundation, College Station, Tex.

No Drawing. Filed Feb. 23, 1962, Ser. No. 175,343
1 Claim. (Cl. 167—78)

This invention relates to a vaccine and particularly to one which is effective in the prevention of infectious keratoconjunctivitis (pinkeye). The invention involves its method of manufacture and the resulting product.

Infectious keratoconjunctivitis, or "pinkeye," is a disease of the eyes of cattle caused by the bacteria *Moraxella bovis*. It is characterized by an acute to chronic inflammation of the eye, and affects cattle of all ages and breeds. As it impairs the sight of the animal and as it is a debilitating disease it causes enormous financial loss in the cattle industry. As the disease is highly contagious it spreads rapidly throughout a herd and may infect as much as eighty percent of the cattle.

Medical treatment of the infected animal is difficult to administer, particularly if it is in a range herd, and the curative results are unsatisfactory. The benefits of the prophylactic treatment of a vaccine, consequently, are obvious.

There are two general colonies of this *Moraxella bovis* species of bacteria, one being the rough-type and the other being the smooth-type, the latter being the one which causes the pinkeye disease. A suitable strain has been deposited in Washington, D.C., and has received the number A.T.C. 10,900. The smooth-type is characterized by its smooth outline. A typical smooth-type culture on blood ager after twenty-four hours of incubation at 37° C. has the following characteristics. Scattered colonies with no tendency toward a confluent growth except where colonies have merged into each other due to their proximity. Colonies are punctiform to 2 mm. in size, with a smooth, moist, and glistening surface generally resembling tiny dew-drops. They are greyish white, circular with an entire edge convex, and translucent. Smooth colonies are surrounded by a clear zone of beta hemolysis, which may reach 2 mm. in width. The colony is firm and breaks when touched with an inoculating loop. A small depression due to liquefraction is present on the mediums when a colony is removed. The smooth colonies do not become suspended in a normal (0.87%) NaCl solution but undergo spontaneous agglutination therein.

The rough-type colony of *Moraxella bovis* is characterized primarly by its rough surface, diffuse outline, softness and may be suspended in normal sodium chloride or salt solution.

In general, the process of the invention comprises, inoculating a suitable culture medium with suspended smooth-type colonies of *Moraxella bovis*, incubating this inoculated medium to obtain growth, killing the harvested *Moraxella bovis* growth and suspending the killed growth in a suitable suspending medium for use. After suspension of the growth, the bacterin or vaccine is ready for use and, as mentioned, it has been found effective in preventing pinkeye in cattle.

As smooth colonies of *Moraxella bovis* agglutinate spontaneously in a normal sodium chloride solution, in order to obtain suspension it is necessary to reduce the salt content of the suspending medium or media. Suitable suspending media for the smooth colonies are double distilled water or up to about 0.02% sodium chloride solution.

The culture medium which is used may be a conventional one in which bacterial growth occurs but it is preferably a Bordet Gengou potato glycerin agar containing from about 5% to about 25% and preferably 10 to 15% defibrinated bovine blood, such as is sold by Difco Laboratories. Preferably, other materials are added to the media to give additional nitrogen, such as 1% proteose peptone sold as Bacte Neopeptone. Other suitable culture media which may be used are nutrient agar plus blood, tryptose phosphate agar plus blood and the like.

The culture medium should be autoclaved before use to sterilize it. It is then placed in a culture bottle so that it will present a large surface, such as a Blake bottle or a Povitsky bottle. The inoculation of the culture medium may be accomplished by swabbing or flowing but preferably by nebulizing the suspended seed culture onto the surface of the culture medium. Nebulization is advantageous because it cuts down the time of inoculation, and has been found to produce the most abundant growth. Moreover, this nebulization tends to overcome any tendency of the bacteria to undergo transformation to the rough type culture. The amount of suspended seed culture introduced onto the culture medium follows normal practice.

The culture medium with the suspended smooth colonies of *Moraxella bovis* is then incubated and this incubation may range from about eighteen hours up to about seventy-two hours at a temperature range from about 25° C. to about 45° C. Very good results have been obtained by incubating the culture medium with the suspended smooth colonies at a temperature of 37° C. for twenty-four hours.

Particularly advantageous growth results if incubation is carried on with the bottles upside down so that the culture surface faces downwardly. The nebulization is preferably onto the upwardly facing surface and the bottles are incubated in this position for a few hours to enable settling of the bacteria and then the bottles are turned upside down. This upside down position removes the culture from the liquid which would otherwise collect on the surface of the culture. This also helps to maintain the organism as the smooth type.

After incubation, the growth is dislodged from the culture medium, such as by scraping or by agitation of the surface with glass beads as the bottle is rocked. The growth is then removed and this is most readily accomplished by adding distilled water as washwater and removing it. The cells of the harvested growth are preferably sedimented by centrifugation and the cells are suspended in a moderate amount of a suitable suspending medium, such as distilled or double distilled water or up to about 0.02% sodium chloride solution. It should be noted that it is not necessary that the suspending medium at this point be the same as that subsequently used in making the suspension for use.

To kill the growth and make it suitable for preparation of the vaccine a bacteriacidal agent such as formaldehyde, merthiolate, quaternary ammonium compounds or benzyl alcohol is used. A suitable agent is a 0.15% formalin solution and from 3 to 10 ml. of it should be used per gram of growth. Usually, 5 ml. of the fluid will be used for each gram of growth to be killed. Contact should be permitted for about a week at 2–5° C. The bacterial content of such a gram of growth will be more or less two billion organisms. The vaccine to be used is made from this killed preparation by the addition of enough of a 0.02% NaCl solution for each ml. to contain two billion cells and about five ml. of this diluted preparation is administered as a dose.

The killing of this culture may as well be accomplished by the addition of enough 1% merthiolate solution to give a final merthiolate concentration of 1:10,000. This mixture is then incubated at 37° C. for 48 hours and then held at 2–5° C. for five days.

The following are specific examples, given for the purpose of disclosure, of manufacturing a stable suspension of bacteria or vaccine according to the invention.

Example 1

Five liter culture bottles were used in the preparation of the bacterin or vaccine. Bordet Gengou potato glycerin agar containing 10% difibrinated bovine blood was used to the culture medium.

The strains of *Moraxella bovis* used in the preparation of the bacterins or vaccines were of recent isolation from infected cattle. They were added to the culture medium in petri dishes and the colonies selected were of the smooth-type. They agglutinated spontaneously in 0.87% sodium chloride solution. These selected colonies were suspended in 3 ml. of double distilled water to give a concentration of 500 to one billion bacterial cells per ml.

The inoculation of the culture bottles with the suspended smooth colonies was carried out by a Vaponefrin nebulizer. The mouth of the nebulizer was inserted into the neck of the culture bottle. Three squeezes of the rubber bulb attached to the nebulizer was sufficient to obtain a heavy growth of well dispersed colonies on the surface of the medium in the culture bottle.

The bacterin was harvested after incubating at 38° C. for thirty hours. Collection of the growth was carried out by the use of metal rakes to remove the growth from the surface of the medium. Twenty ml. of 0.02% sodium chloride solution was added to each culture bottle to aid in removing the growth from the culture medium, and pipettes were used to remove the growth from the bottle to a collecting flask.

After the collection of the growth from the culture bottles the supernatant fluid was poured off leaving the growth in the flask. The growth in the flask was weighed and re-suspended in 0.02% sodium solution by adding 10 ml. of this solution to each gram of bacterin or vaccine cells of *Moraxella bovis*. To this suspension is added 5 ml. of a 0.15% formalin solution and it is allowed to stand at 2–5° C. for a seven day period to kill the growth. In general, one gram of bacterial cells of *Moraxella bovis* is equal to about two billion cells by direct counting, using a counting chamber. About 5 ml. of this suspension is used as the dose of vaccine per animal.

Example II

*Culture media.*—Five percent Bordet Gengou agar base (Difco Laboratories) is suspended in a 1 percent solution of glycerol in double distilled water. It is sterilized in the autoclave for 15 minutes at 15 pounds' pressure. It is then cooled at 45–59° C. and to it is added fresh defibrinated bovine blood to make a final concentration of 10–20 percent.

Diphtheria toxin culture bottles of 5 liter capacity are used and 225 ml. to 300 ml. of the media is added to each bottle.

*The seed culture.*—The strains of *Moraxella bovis* which are to be used in the preparation of vaccines should be freshly isolated from the acute or subacute forms of the disease in non-treated cattle. Their virulence should be proved by reproducing the disease in susceptible Hereford calves, two weeks to two months old.

Typical smooth colonies are fished and streaked on petri dishes containing Bordet Gengou blood agar. A series of 10 or more petri dishes are inoculated and incubated from 18–20 hours at 37° C. A further careful study is then made of the colonies. If the colonies have maintained their smooth appearance, a few are fished and suspended in 2 ml. of double distilled water. One milliliter of this suspension is placed in 5 ml. of sterile physiological normal salt solution. Spontaneous agglutination should take place almost immediately with a complete clumping and settling of the bacteria if the colonies are completely smooth.

The colonies have been judged to be smooth strains and therefore satisfactory for the preparation of the seed culture are suspended in double distilled water and the suspension is standardized by opacity to contain from 500 million to one billion bacteria per milliliter.

*Inoculating the diptharia toxin culture bottles.*—The inoculation is done by the use of a Vaponefrin Standard nebulizer (Vaponefrin Company, Upper Darby, Pa.). The nebulizer is equipped with an 8 inch piece of rubber tubing attached to a rubber squeeze bulb. The seed culture is sprayed over the surface of the media in the bottles using two or three squeezes of the rubber bulb for each bottle inoculate.

Following inoculation the bottles are turned over and placed in the incubator at 37° C. The time of incubation depends somewhat on the growth rate of a given strain, but usually the vaccine is ready for harvest after 24 to 30 hours.

*Harvesting.*—Before the collection of the growth is begun each bottle is inspected with the greatest care. Any bottle showing the slightest suspicious evident of a typical growth or contamination is discarded.

Twenty milliliters of a 0.02 percent sodium chloride solution or distilled water is added to each bottle just before removal of the growth. The growth is removed from the surface of the media by scraping, and the growth is then transferred to the collecting flask.

*Suspension killing and standardization.*—The harvested growth will quickly settle leaving an almost clear supernatant fluid. The supernatant fluid is then poured off. The remaining growth is then weighted and 0.02 percent sodium chloride to which an equal amount of 0.15 percent formalin had been added is added to the collecting flask at the ratio of 5 ml. of fluid to each gram of growth. Some strains will require from 7–10 ml. per gram of growth, but the average strain will form a uniform suspension by using the lower fluid ratio.

A sample is then taken and counted. The vaccine is further diluted so that each milliliter contains 2 billion bacteria.

*Dosage.*—In adult cattle, 5 ml. containing 2 billion bacteria per milliliter giving a total of 10 billion cells will give adequate protection against the disease for six months as determined by challenge. Calves 2 weeks to 6 months should have one 5 ml. injection followed by another 5 ml. injection in 14 days.

Effective protection may be achieved with a unit dosage of as low a concentration as two billion organisms and as much as a total of sixteen billion organisms may be administered as a dose. This may be accomplished by regulating the concentration of cells in the bacterin or by the volume of bacterin administered, or both.

What is claimed is:

The process for making a vaccine to immunize cattle against infectious keratoconjunctivitis which comprises forming an aqueous suspension of a smooth colony of *Moraxella bovis*, A.T.C. 10,900, spraying the suspension upon the surface of a Bordet Gengou potato glycerine culture medium containing blood cells, incubating the culture medium while in an inverted position for a period of 18 to 72 hours at a temperature of from 25° to 45° C., harvesting the cells and suspending them in a saline solution containing up to 0.02% by weight of sodium chloride, adding a bactericide selected from the group consisting of formalin, merthiolate, quaternary ammonium compounds and benzyl alcohol, holding for a period to kill all the bacteria, and dispensing into containers from which the vaccine will be administered.

References Cited by the Examiner

UNITED STATES PATENTS 2,682,492   6/54   Huddleson _____ 167—78

OTHER REFERENCES

Animal Diseases, The United States Dept. of Agriculture, Washington, D.C., 1956, pp. 313–314.

Biol. Abst., 1945, p. 1499, par 13767.

Jones et al., J. Exp. Med., Aug. 1, 1923, pp. 139–148.

Kelser, Manuel of Veterinary Bacteriology, pub. by Williams and Wilkens Co., 1948, pp. 246–248.

Merck, The Merck Veterinary Manual, published by Merck Co., Rahway, New Jersey, 1955, pp. 247–248.

Reed, Texas Reports on Biol. and Med., pp. 187–203.

LEWIS GOTTS, *Primary Examiner.*

MORRIS O. WOLK, FRANK CACCIAPAGLIA, JR.,
*Examiners.*